United States Patent [19]
Barrett et al.

[11] 3,811,713

[45] May 21, 1974

[54] FLUID-TIGHT HIGH TEMPERATURE FLEXIBLE JOINT

[75] Inventors: Hillard E. Barrett, Hillsdale; Donald B. Clark, Wayne; Bernard Seid, Cedar Grove, all of N.J.

[73] Assignee: The United States of America as represented by the Secretary of the Army, Washington, D.C.

[22] Filed: Nov. 28, 1958

[21] Appl. No.: 776,872

[52] U.S. Cl............. 285/226, 60/232, 239/265.19, 285/263, 285/265
[51] Int. Cl............................................. F16l 5/00
[58] Field of Search.......... 60/35.54, 35.55, 35.6 R, 60/39.31, 39.32; 285/226–229, 235, 261, 265, 45 X, 95, 100, 11; 239/587

[56] References Cited
UNITED STATES PATENTS

| | | |
|---|---|---|
| 846,379 | 3/1907 | Ambrose et al. .................. 285/229 |
| 1,821,274 | 9/1931 | Plummer............................. 285/11 |
| 1,947,657 | 2/1934 | Peress................................ 285/11 |
| 2,936,185 | 5/1960 | Olsen et al......................... 285/226 |
| 1,802,176 | 4/1931 | Knight ............................ 285/265 X |
| 2,451,252 | 10/1948 | Stoeckly ........................... 285/100 |
| 2,798,743 | 7/1957 | Olesten............................. 285/229 |
| 2,826,403 | 3/1958 | Moklebust...................... 285/41 X |

FOREIGN PATENTS OR APPLICATIONS 1,025,827  1/1953  France............................. 60/35.55

Primary Examiner—Samuel Feinberg
Attorney, Agent, or Firm—Edward J. Kelly; Herbert Berl

EXEMPLARY CLAIM

1. A flexible fluid tight connection for high temperature gases; said connection comprising first and second substantially abutting tubular parts for transmitting said gases; means disposed outside of the abutting ends of said tubular parts and connecting said parts together so as to permit tilting adjustment of the axis of one of said parts relative to that of the other of said parts; an annular flexible diaphragm having one end connected to one part and the other end connected to the other part, said diaphragm being disposed so as to bridge the outer side of the abutting ends of said parts so as to provide a seal there across; a ring of rubber-like material also bridging the outer side of the abutting ends of said parts but being disposed inwardly of both said diaphragm and said connecting means, said ring having a first portion bonded to one of said parts and a second portion bonded to the other of said parts so as to provide an annular sealed space between said ring and diaphragm; and a liquid disposed within said sealed space.

7 Claims, 3 Drawing Figures

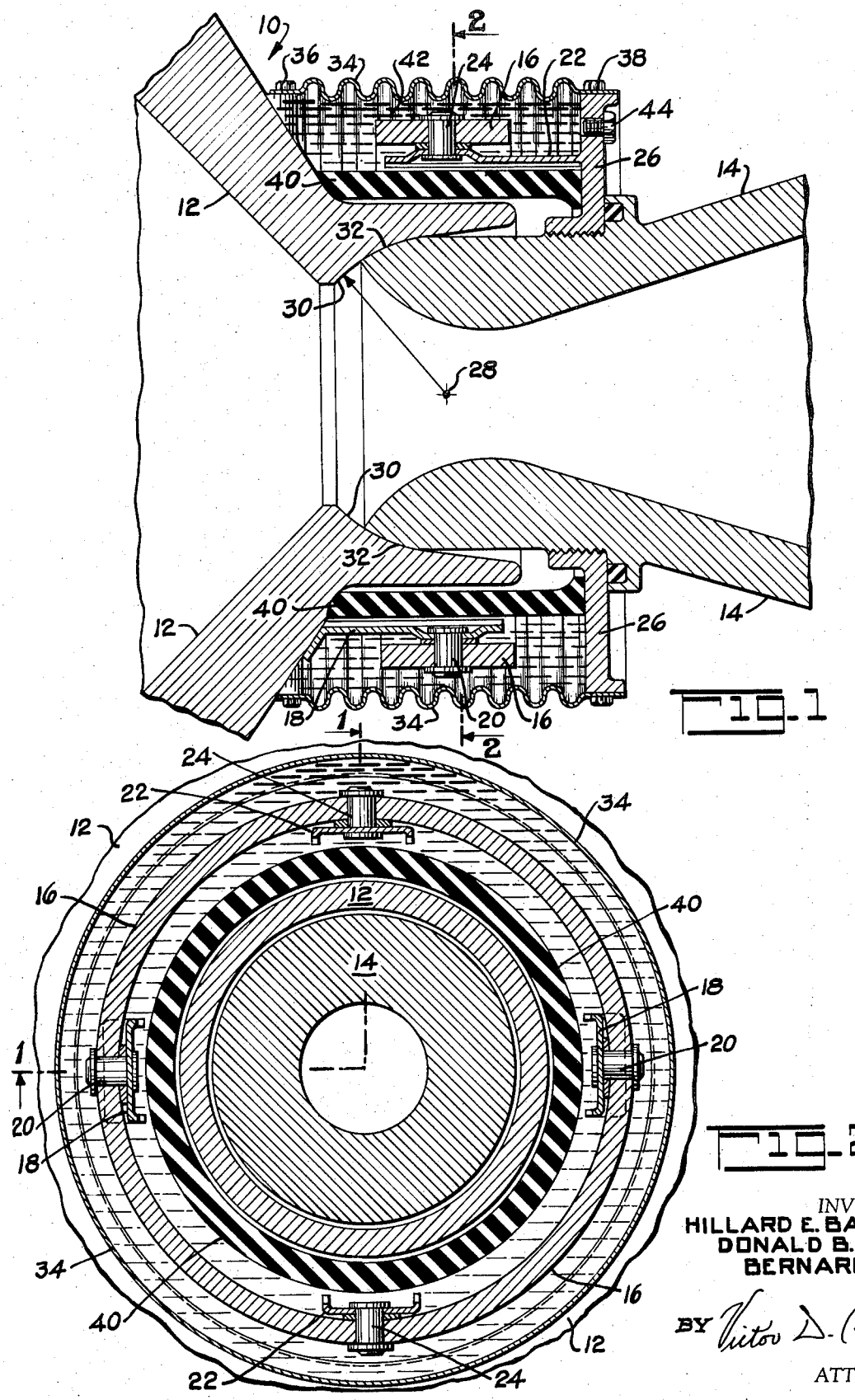

INVENTORS
HILLARD E. BARRETT
DONALD B. CLARK
BERNARD SEID

ATTORNEY

FLUID-TIGHT HIGH TEMPERATURE FLEXIBLE JOINT

This invention relates to flexible fluid tight joints and is particularly directed to such joints for fluids under high temperatures and pressures such as the exhaust gases of a rocket engine.

The direction of the thrust produced by a rocket engine can be varied by providing a flexible connection in the exhaust nozzle or passageway so that the direction of discharge end of said nozzle can be varied whereby said nozzle discharge end is dirigible or steerable. In the case of a rocket engine, the temperature of the exhaust gases is sufficiently high to cause the junction of the fixed and movable part of such a dirigible nozzle to burn out should there be any leakage flow of the hot exhaust gases through said junction. In accordance with the present invention a suitable seal is provided across such a junction to prevent leakage flow of the hot rocket gases therethrough. It is important that the stiffness of such a fluid tight joint be held to a minimum in order that the actuating forces required to change the nozzle direction be held to a minimum.

An object of the present invention comprises the provision of a novel and simple fluid tight joint for a dirigible rocket jet engine exhaust nozzle, particularly for use in rocket missiles in which the duration of flight is quite short, for example of the order of several minutes. A further object of the invention comprises the provision of a bellows or other flexible diaphragm type seal in which novel means are provided for insulating the flexible diaphragm seal from the high temperature gases being sealed.

A still further object of the invention comprises the provision of a novel diaphragm type seal.

Other objects of the invention will become apparent upon reading the annexed detailed description in connection with the drawing in which:

FIG. 1 is an axial sectional view of a rocket engine embodying the invention:

FIG. 2 is a sectional view taken along line 2—2 of FIG. 1; and

Figure 3:
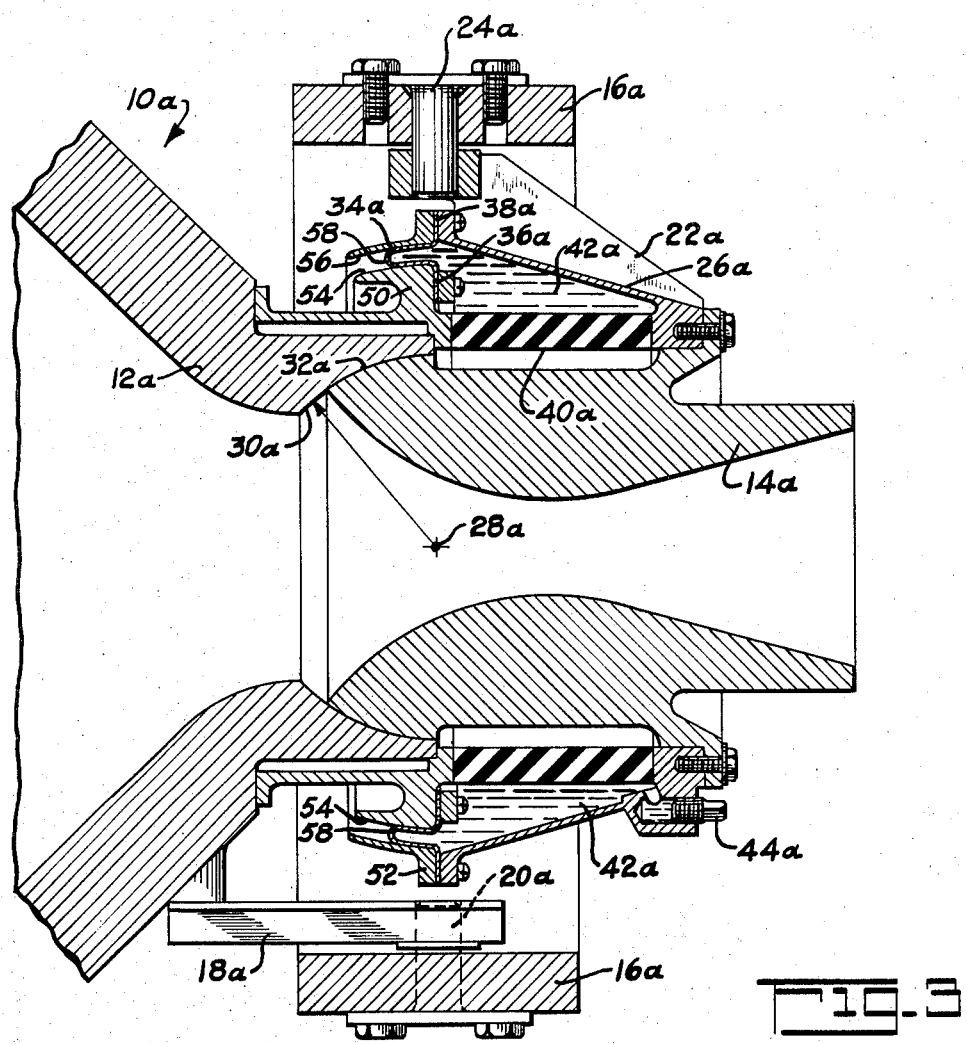
FIG. 3 is a view similar to FIG. 1 but illustrating a modified construction.

Referring first to FIGS. 1 and 2 of the drawing the exhaust nozzle 10 of a rocket engine is illustrated as comprising a fixed upstream tubular part 12 and an angularly adjustable downstream tubular part 14 through which the exhaust gases discharge into the surrounding atmosphere. As illustrated, the nozzle 10 preferably has a convergent-divergent profile with the junction between the fixed and movable nozzle parts preferably being in the convergent portion of the nozzle.

The nozzle 10 is provided with a gimbal ring 16. A first pair of diametrically-opposed arms 18 are each pivotally connected at one end to the gimbal ring 16 by a pivot pin 20. The two pins 20 are axially alined. The other end of each arm 18 is rigidly connected to the fixed nozzle part 12. A second pair of diametrically-opposed arms 22, rotatively displaced 90° from said first pair, are each pivotally connected at one end to the gimbal ring 16 by a pivot pin 24. The two pins 24 are also axially alined with its axis rotatively displaced 90° from the axis of pins 20. The other end of each arm 22 is rigidly connected to the downstream nozzle part 14 through a flange 26 secured to said part 14.

With this construction of the gimbal ring and its connections to the nozzle parts 12 and 14, the part 14 can be angularly adjusted in any direction, for example by motor means (not shown) connected to the nozzle part 14. Preferably the axis of the pairs of pins 20 intersect the axis of the pins 24, their intersection being indicated at 28 on the axis of the upstream nozzle part 12.

The downstream end surface of the part 12 preferably has a spherical portion indicated at 30, with its center at the point 28. The adjacent surface of the part 14 is likewise made spherical, as indicated at 32, with its center also being at the point 28. The spherical surfaces 30 and 32 preferably are provided with substantially the same radii to provide a close fit therebetween so that the internal surface of the nozzle is substantially continuous in all positions of angular adjustment of the downstream nozzle part 14.

A seal is provided across the outer side of the junction of the two nozzle parts 12 and 14, that is across the outer side of their facing spherical surfaces 30 and 32. For this purpose an annular flexible diaphragm 34, bellows-type, is connected across said junction. One end of the bellow 34 is connected to the nozzle part 12 at 36 while the other end is connected to the nozzle part 14 at 38.

An annular ring 40 of rubber-like material, such as a silicone rubber, capable of withstanding high temperatures for at least a short period of time, is disposed between the bellows 34 and the junction of the nozzle parts 12 and 14. One edge of the rubber ring 40 is suitably bonded to the nozzle part 12 and the other edge of said ring is suitably bonded to the nozzle part 14.

The annular rubber-like ring 40 is disposed within the annular bellows 34 and is spaced therefrom to leave an annular space 42 therebetween. Said annular space 42 is filled with a suitable liquid, such as a high temperature synthetic oil. This liquid should be capable of withstanding high temperatures and should be inert to the material of the ring 40. The liquid is thereby sealed within the annular space 42. Suitable plugs 44 are provided for filling the space 42 with liquid.

With this construction, angular deflection of the downstream nozzle member 14 increases the stretch of the rubber like ring 40 on one side of the nozzle axis and decreases said stretch or places the ring in compression on the other side, while the liquid in the space 42 between the bellows 34 and said ring is merely displaced from one side to the other of said space. It is apparent therefore that the primary resistance to angular deflection of the nozzle part 14 is offered by the bellows 34. The rubber-like ring 40 and liquid within the space 42 function as a flexible heat barrier to protect the bellows 34 from contact with and destruction by the hot exhaust gases of the rocket.

As illustrated, the gimbal ring 16, its pivot pin connections 20 and 24 to the arms 18 and 22 and said arms are all disposed within the annular space 42. With this arrangement the liquid within said space also serves to lubricate said pivotal connections. If desired, said gimbal ring and its said associated parts could however be disposed outside of the bellows 34.

FIG. 3 discloses a modification incorporating a modified flexible diaphragm arrangement for minimizing the resistance offered by the flexible diaphragm to angular deflection of the nozzle. FIG. 3 is otherwise like FIGS. 1 and 2. For ease of understanding, the parts of FIGS. 3 corresponding to the parts of FIGS. 1–2 have been designated by the same reference numerals but with a subscript *a* added thereto.

In FIG. 3 a pair of annular members 50 and 52 are secured to nozzle members 12a and 14a respectively, the member 52 being secured to the nozzle member 14a through its flange 26a. The annular members 50 and 52 have facing spherical surfaces 54 and 56 respectively each having its center at the point 28a. The surfaces 54 and 56 have different radii so that they are spaced apart. An annular flexible diaphragm 34a has one edge secured at 36a to the nozzle part 12a adjacent to one edge of the spherical surface 54 and has its other edge secured at 38a to the nozzle part 14a adjacent to the corresponding edge of the spherical surface 56. Between its edges the diaphragm has a single annular convolution 58 which lies between the spherical surfaces 54 and 56 so that each annular half of said convolution lies against the adjacent one of said spherical surfaces. The diaphragm 34a preferably is a flexible fabric type material. With this construction angular deflection of the downstream nozzle part 14a about an axis through the point 28 causes one annular half of the flexible diaphragm convolution 58 to unwrap from one spherical surface 54 or 56 onto the other of said spherical surfaces. With this construction the flexible diaphragm 34a offers relatively little resistance to angular deflection of the downstream nozzle part 14a. As in FIGS. 1 and 2, the flexible diaphragm 34a and annular rubber-like ring 40a are spaced apart to leave an annular space therebetween within which a suitable liquid is sealed whereby said ring and liquid function as a flexible heat barrier or insulator for the flexible diaphragm 34a from the hot exhaust gases discharging through the nozzle.

In FIG. 3 the gimbal ring 16a and its connecting arms 18a and 22a to the nozzle parts 12 and 14 are disposed outside the flexible diaphragm 34a. Obviously, however, as in FIGS. 1 and 2 said gimbal ring and associated parts could be and preferably are disposed within the annular liquid containing space 42a.

While we have described our invention in detail in its present preferred embodiment, it will be obvious to those skilled in the art, after understanding our invention that various changes and modifications may be made therein without departing from the spirit or scope thereof. We aim in the appended claims to cover all such modifications.

We claim as our invention:

1. A flexible fluid tight connection for high temperature gases; said connection comprising first and second substantially abutting tubular parts for transmitting said gases; means disposed outside of the abutting ends of said tubular parts and connecting said parts together so as to permit tilting adjustment of the axis of one of said parts relative to that of the other of said parts; an annular flexible diaphragm having one end connected to one part and the other end connected to the other part, said diaphragm being disposed so as to bridge the outer side of the abutting ends of said parts so as to provide a seal there across; a ring of rubber-like material also bridging the outer side of the abutting ends of said parts but being disposed inwardly of both said diaphragm and said connecting means, said ring having a first portion bonded to one of said parts and a second portion bonded to the other of said parts so as to provide an annular sealed space between said ring and diaphragm; and a liquid disposed within said sealed space.

2. A fluid tight connection as claimed in claim 1 and in which said diaphragm is a flexible bellows type.

3. A fluid tight connection as claimed in claim 1 and in which said diaphragm is a flexible bellows type having only a single convolution.

4. A fluid tight connection as claimed in claim 3 and in which said parts have a pair of concentric spherical surfaces facing each other but of different radii with said single convolution having one side lying against one of said spherical surfaces and having its other side lying against the other of said spherical surfaces, the axis of tilting adjustment of said first and second tubular parts including the center of said spherical surfaces.

5. A fluid tight connection as claimed in claim 1 and in which the abutting ends of said tubular parts have mating surfaces permitting said tilting adjustment.

6. A fluid tight connection as claimed in claim 1 and in which the abutting ends of said tubular parts have mating concentric spherical surfaces permitting said tilting adjustment.

7. A flexible fluid tight connection for high temperature gases; said connection comprising first and second tubular parts having a pair of concentric mating spherical surfaces at their adjacent ends, means disposed outside of said mating spherical surfaces for connecting said parts together for universal adjustment of one of said parts relative to the other about the common center of said spherical surfaces; said parts having a second pair of concentric spherical surfaces facing each other but having different radii, said second pair of spherical surfaces being disposed outside of said first pair with the common center of said second pair of spherical surfaces coinciding with the center of said universal adjustment; an annular flexible diaphragm having one edge connected to one part and its other edge connected to the other part adjacent to said second pair of spherical surfaces to provide a seal there across, said diaphragm having a single convolution disposed between said second pair of spherical surfaces so that one side of said convolution lies against one of said second pair of spherical surfaces and the other side of said convolution lies against the other of said second pair of spherical surfaces; a ring of rubber-like material disposed outside of said first pair of mating spherical surfaces but inside of said second pair, said ring having a first portion bonded to one of said parts and a second portion bonded to the other of said parts so as to provide an annular sealed space between said ring and diaphragm; and a liquid within said sealed space.

* * * * *